April 9, 1957 W. F. HAMANN 2,787,894
COUPLING DEVICES
Filed July 17, 1953 2 Sheets-Sheet 1

April 9, 1957

W. F. HAMANN 2,787,894

COUPLING DEVICES

Filed July 17, 1953

United States Patent Office 2,787,894
Patented Apr. 9, 1957

2,787,894
COUPLING DEVICES
Walter F. Hamann, Queens, N. Y.
Application July 17, 1953, Serial No. 368,629
3 Claims. (Cl. 64—8)

This invention relates generally to the field of shaft coupling devices for use in interconnecting shafts for the transmitting of rotational motion therethrough. The invention has application in situations where the shafts which are interconnected by the devices are coaxially disposed, as well as those situations in which the axes of the shafts intersect, rather than coincide. The invention also has application to those situations in which the angular degree at which one shaft meets another varies during use.

In the past there have been many devices known in the art which have been used for similar applications. The widely employed universal joint has been used in the automobile industry extensively, for example, and various sprocket, chain and gear arrangements have also been employed in stationary installations. The universal joint suffers from one great disadvantage, in that the same is comprised of a relatively large number of parts which require frequent servicing and lubrication. In addition, it must be manufactured with relatively large dimensions in order to carry substantial loads. Other devices used for stationary installations have been used with some measure of success, but have failed to provide sufficient flexibility for use with shafts which are misaligned more than a few degrees.

It is therefore among the principal objects of the present invention to provide a shaft coupling in which all of the above-mentioned disadvantages have been substantially eliminated.

Another object of the invention lies in the provision of a shaft coupling device which, although relatively small in over-all size, is adapted to transmit many horse power without damage or undue stress.

Another object of the invention lies in the provision of a device of the class described in which the cost of fabrication may be of a relatively low order, with consequent wide sale, distribution and use.

A further object of the invention lies in the provision of a shaft coupling device in which shafts may be interconnected which are disaligned a much greater degree than has heretofore been possible with conventional devices.

A feature of the invention lies in the fact that the device employs relatively few parts of simple rugged construction, thereby permitting the device to have a relatively long trouble-free useful life.

Another feature of the invention lies in the fact that where the angular displacement between the shafts being coupled is extreme, several couplings may be connected in series to effect the desired interconnection.

A further feature of the invention lies in the provision of novel means incorporated in the same to prevent the binding of the component parts during the transmission of power therethrough.

These objects and features, as well as other incidental ends and advantages will become more clearly apparent during the course of the following disclosures, and be pointed out in the appended claims.

On the drawings, to which reference will be made in the specifications, similar reference characters have been employed to designate corresponding parts throughout the several views.

Before entering into a detailed description of the device, it will be helpful to consider the properties of a geometric figure commonly known as the normal extensions of a three-cusp hypocycloid.

Figure 7:
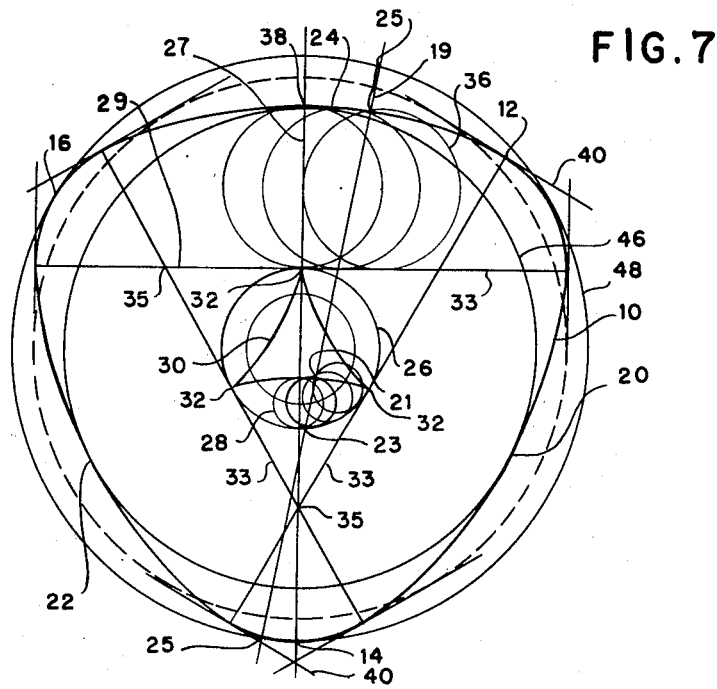
Figure 7 is a schematic view of the geometric figure upon which the invention is based.

Referring to Figure 7 of the drawing, this geometric figure is indicated by reference character 10. Concentric with the normal extension 10 and in a definite relation thereto is the three-cusp hypocycloid 30 employed to generate the normal extension of the figure 10. The hypocycloid 30 is generated within what is known as a base circle 26 by what is known as a rolling circle 28. Where three-cusp hypocycloid 30 is to be generated, the rolling circle 28 has a diameter equal to one-third the diameter of the base circle 26.

The three-cusp hypocycloid 30 may be generated by the following outlined method, although it is to be understood by those skilled in the art that any accepted method may be employed. By selecting a point on the rolling circle 28, and rolling the circle 28 within and on the periphery of the base circle 26 without slippage, the selected point will generate the locus of points which forms the hypocycloid 30.

It is one of the characteristics of a hypocycloid that the instantaneous radius 19 of the same coincides with a line which passes through the instantaneous generating point 21 of the rolling circle 28 and the corresponding instantaneous contact point 23 between the rolling circle 28 and the base circle 26. This instantaneous radius is often referred to as the instantaneous normal of the hypocycloid. The normal extensions of the hypocycloid are created by selecting a convenient point 25 on the instantaneous normal at a distance referred to as "$Dm/2$" equal distance on both sides of the instantaneous generating point 21. The point 25 on each side of the instantaneous normal will trace the locus of points forming the normal extensions of the three-cusp hypocycloid 10.

The figure indicated by reference character 10 may be placed between two parallel tangents indicated by reference character 40, as shown on Figure 7, and it will be observed that if the figure is rotated between the same, there will be no loss of contact. This fact shows that all normal diameters which are equal in value to the quantity DM are of the exact same length.

From Figure 7, it may be observed that two such normal diameters, as for example 27 and 29 intersecting at 90° and passing through the corresponding largest extremities of the figure 10, for any particular angle of rotation will constitute the two axes about which the figure 10, if confined within a hole or bore of the same shape, can rotate. If more normal diameters (not shown) are drawn, which intersect at 90°, it will be found that the intersection of the two axes will always coincide with a point located on the circle 26. Thus a solid having an outer surface corresponding to that of figure 10 will at all times find its axis when inclined to the confining hole or bore on this circle 26 and along one of the axes mentioned above. This is so because rotation must occur about an axis joining the widest extremities of the solids, since otherwise a wider portion of the solid would be forced against a narrower portion of the hole or bore. Because, however, all axes of possible rotation which intersect the base circle 26 are perpendicular to the tangents 40 and are of equal length, it is clear that the device may be rotated about an axis disposed at any given angle. It is also apparent that irrespective of the amount of rotation of the imaginary bore or hole about its axis, the solid engaged therein must rotate therewith along the cylindrical axis of both, as there is no opportunity for slippage to occur therebetween.

Upon further consideration of the figure 10, if an inscribed circle 46 is drawn tangent to the three flattest portions of figure 10, and a circumscribed circle 48 is drawn tangent at the largest extremities of the figure 10, it can be shown that the periphery of the figure 10 is equivalent to a periphery of a circle, the diameter of which is equal to the diameter of the inscribed circle 46, plus one-half of the difference between the circumscribed circle 48 and the inscribed circle 46. This diameter is referred to as the normal diameter of the figure, as discussed above.

This particular phenomenon holds true irrespective of the number of cusps of the normal extensions of a hypocycloid, provided the number of cusps is greater than one. With this in mind, reference may now be made to Figures 1 to 6, inclusive, which show a practical application of the characteristics of the hypocycloid in a shaft coupling device.

In accordance with the first embodiment of the invention, the device, generally indicated by reference character 51, is shown mounted upon a pair of shafts 53 and 55 for the purpose of allowing one of the shafts to rotationally drive the other. The device includes a first shaft engaging element 57, a second shaft engaging element 59, and an interconnecting element 61. The elements 57 and 59 are substantially similar, so that a detailed description of one of the elements will serve equally well to describe the other, thereby avoiding needless repetition. To this end, similar reference characters have been employed to designate corresponding parts on the element 59, with the additional suffix prime "'".

The first shaft engaging element 57 includes a tubular member 63, which surrounds the end of the shaft 53, and which is fixed thereupon by any suitable means (not shown) as for example a force fit, a key, or the like. At the inner end of the member 63 is a contacting member 65 which has a cross section substantially in the shape of a hypocycloid. As may be seen on Figure 1, the peripheral surface 67 is not planar in configuration, but is generally curvilinear, and has an instantaneous radius of curvature which may be shown to vary from $DM/2-4b \sin 3/2\theta$ to $DM/2+4b \sin 3/2\theta$, where $b$ is the radius of the rolling circle from which the normal extension was generated, $\theta$ is the degree of arc on the base circle as measured from the starting point. For many practical applications the radius of curvature may be evaluated as $DM/2$, owing to the relatively small degree of flexure required and the clearance between the parts.

Disposed outwardly of the surface 67 is a groove 69 generally circular in cross section and hypocycloidal in shape in which there is disposed an oil or lubrication seal 71, commonly known in the art as an O ring. Further outwardly from the groove 69, and also having a hypocycloidal shape, is a limiting member 73, the purpose of which will become more clearly apparent at a point later in the disclosure. The tubular member 63 is generally circular in cross section, and, as may be seen on Figure 1, the over-all dimension of the same is substantially smaller than the other parts of the element 57. The central bore 75 is of annular cross section.

The interconnecting element 61 may be generally cylindrical in outer configuration, including an outer surface 77, and end surfaces 79 and 81. Extending between the surfaces 79 and 81 is a hypocycloidally-shaped bore 83 corresponding to the surfaces 67 of the shaft engaging element 57. At points near the surfaces 79 and 81, there are provided grooves or recesses 85 adapted to receive snap rings 87, which are adapted to abut the members 73 to maintain the elements 57 and 59 within the element 61. A threaded cap 89 may be removed to provide ingress to a small orifice 90 to permit oil, grease or other lubricants to be injected within the bore 75.

Figure 6:
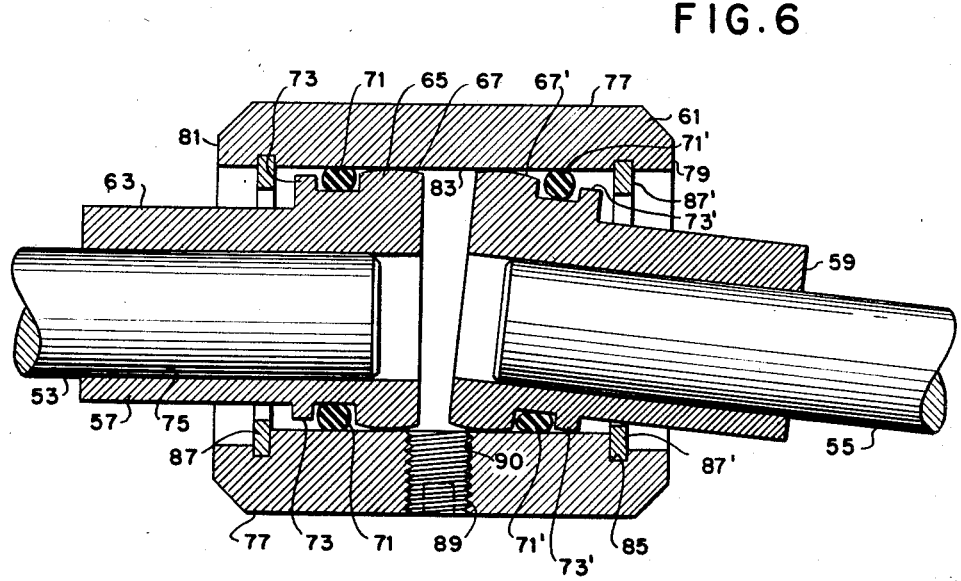
Figure 6 is an enlarged fragmentary vertical longitudinal sectional view corresponding to that seen on Figure 1, but showing one of the component parts in a relatively altered position thereof.

Reference is now made to Figure 6 of the drawing, wherein the degree of flexure or angularity between the shafts 53 and 55 which may be present in an operable device is shown. Where the shafts are misaligned, the device will function in a manner similar to that of the universal joint, to a degree wherein the limit member 73 contacts the inner surface of the bore 75. As has been mentioned, where extreme limits are necessary, a pair of devices 51 may be employed in series. As the shafts are rotated, the shaft engaging elements 57 and 59 will rotate about an axis which is one of the nominal diameters of the figure 10, which will constantly shift as rotation of the shafts 53 and 55 occurs. The instantaneous axis of rotation is determinable, since there is only one other instantaneous nominal diameter which is perpendicular to the instantaneous axis of rotation. Because each of the two shaft engaging elements 57 and 59 are provided with an engaging portion which is hypocycloidally shaped, a degree of skew between the shafts 53 and 55 may be present without danger of injury to the device.

Figure 2:
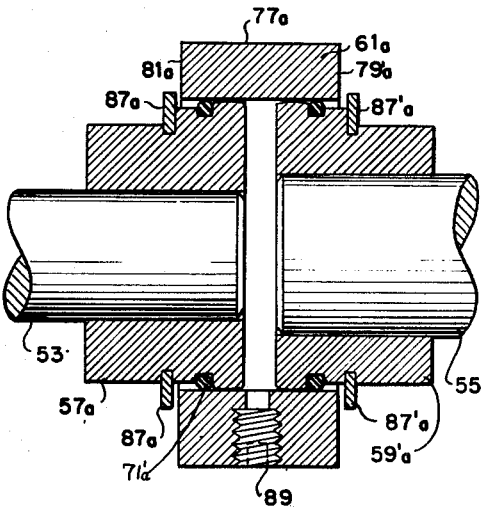
Figure 2 is a fragmentary vertical longitudinal sectional view showing a second embodiment of the invention.
Figure 4:
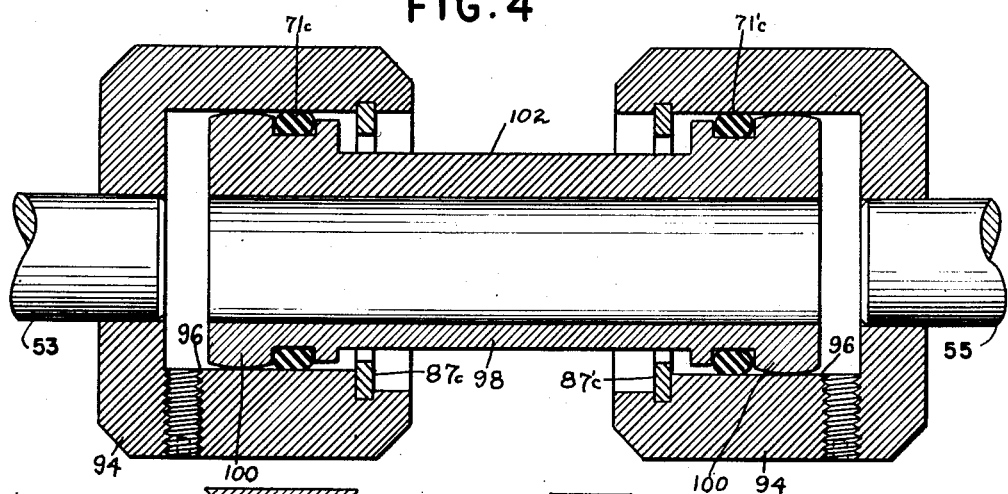
Figure 4 is a fragmentary vertical longitudinal sectional view showing a fourth embodiment of the invention.
Figure 3:
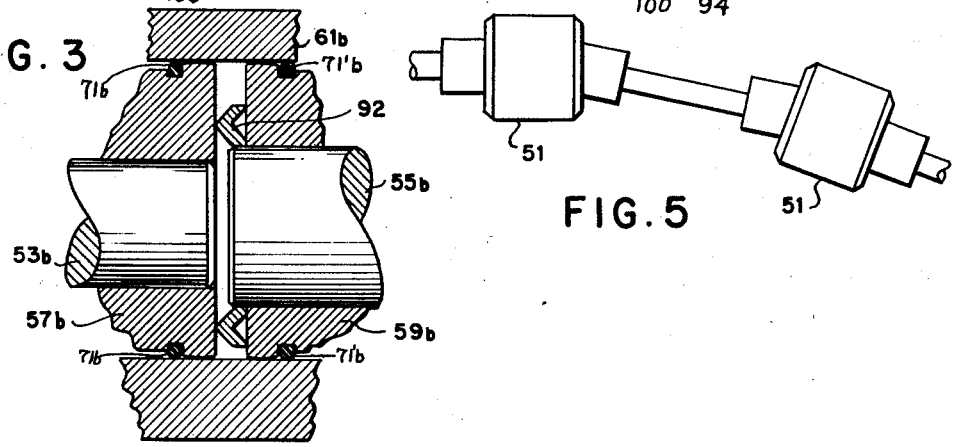
Figure 3 is a fragmentary vertical longitudinal sectional view showing a third embodiment of the invention.
Figure 5:
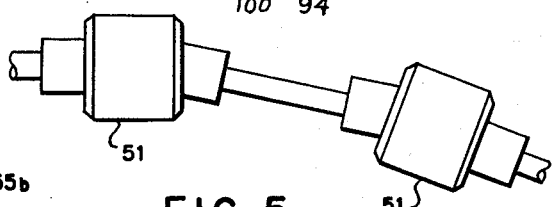
Figure 5 is a fragmentary view in elevation showing the interconnection of several of the devices where the extreme angularity between coupled shafts occurs.

Turning now to the second embodiment of the invention, as seen on Figure 2, parts corresponding to those of the first embodiment have been designated by similar reference characters with the additional suffix "a."

Figure 1:
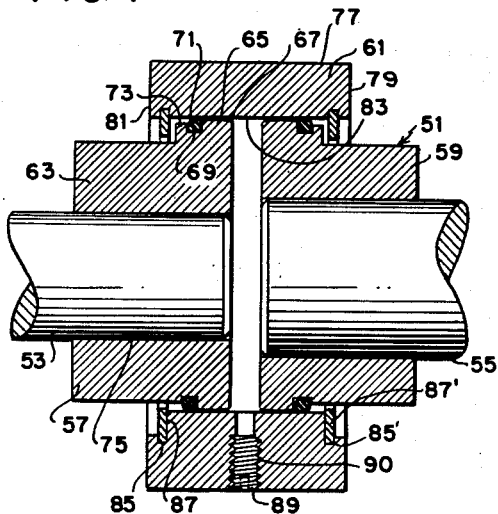
Figure 1 is a fragmentary vertical longitudinal sectional view showing a first embodiment of the invention.

The second embodiment of the invention differs from the first embodiment shown on Figure 1 principally that the snap rings 87a are mounted within grooves on the shaft engaging elements 57a and 59a, rather than the interconnecting element 61a. This embodiment is of particular application where there is a likelihood that the shafts 55 and 57 may be pushed too close to each other, rather than too far away from each other, and maintain the interconnecting element 61a in engagement upon the shaft engaging elements. This structure permits the use of a smaller interconnecting element 61a, where this particular construction is necessary.

Turning now to the third embodiment of the invention, to avoid needless repetition, certain parts corresponding to those of the first and second embodiment have been designated by similar reference characters with the additional suffix "b."

The third embodiment of the invention differs from the first and second embodiments principally in the provision of means in the form of a chevron ring 92 between the opposed faces of the shaft engaging elements 57b and 59b. This ring incidentally provides an effective seal for lubrication disposed between the shaft engaging elements.

Turning now to the fourth embodiment of the invention, parts corresponding to those of the first embodiment have been designated by similar reference characters with the additional suffix "c." The fourth embodiment of the invention differs from the first three embodiments in that the solid hypocycloids are on the interconnecting element 98, rather than on the shaft engaging elements 94. The shaft engaging elements 94 are provided with hypocycloidal bores 96, while the interconnecting element 98 includes two hypocycloidally shaped end members 100 interconnected by an elongated shaft member 102. The operation of the fourth embodiment of the invention is similar to that of the other embodiments.

It may thus be seen that I have invented novel and highly useful improvements in shaft coupling devices, in which there is provided simple easily constructed means possessing high mechanical strength which are adapted to transmit large amounts of power with relatively little stress or wear on the moving parts thereof. The device includes means for preventing sticking or jamming, and has varied application to a large number of uses. Owing to the great simplicity of the device, years of trouble free useful life may be expected, and the small amount of servicing which may be required may be easily performed. Where desired, hypocycloidal shapes of more than three-cusps may be employed, with comparable results.

I wish it to be understood that we do not consider the invention limited to the exact details of structure shown and set forth in this specification, for obvious modifications will occur to those skilled in the art to which the present invention pertains.

I claim:

1. A shaft coupling device for use in interconnecting a pair of misaligned shafts for transmitting rotational motion therethrough comprising: first and second shaft engaging elements and an interconnecting element; said first and second shaft engaging elements each having first similar mating surfaces substantially in the shape of an equidistant normal extension of a three cusp hypocycloid; said interconnecting element having second mating surfaces in the shape of said equidistant normal extension of said three cusp hypocycloid and adapted to simultaneously slidably engage each of said first and second shaft engaging elements; one of said first and second mating surfaces having a crown radius, the curvature of which is equal to substantially one-half the nominal diameter of said equidistant normal extension of said three cusp hypocycloid.

2. A shaft coupling device for use in interconnecting a pair of misaligned shafts for transmitting motion therethrough comprising: first and second shaft engaging elements and an interconnecting element; said first and second shaft engaging elements each having an outer mating configuration, the shape of which corresponds to an equidistant normal extension of a three cusp hypocycloid, and having a crown radius of substantially one-half the nominal diameter of said equidistant normal extension of said three cusp hypocycloid; said interconnecting element having a bore therein forming a second mating configuration, the surface of which corresponds to said equidistant normal extension of said three cusp hypocycloid and being adapted to slidably engage each of said mating surfaces on said first and second shaft engaging elements.

3. A shaft coupling device for use in interconnecting a pair of misaligned shafts for transmitting motion therethrough comprising: first and second shaft engaging elements and an interconnecting element; said first and second shaft engaging elements each having substantially equally sized bores forming first mating surfaces in a shape corresponding to the equidistant normal extension of a three cusp hypocycloid; said interconnecting element having a principal axis and bore engaging portions at each end thereof, said bore engaging portions each having an outer mating configuration in a shape corresponding to said equidistant normal extension of said three cusp hypocycloid, and having a crown radius of substantially one-half the nominal diameter of said equidistant normal extension of said three cusp hypocycloid.

References Cited in the file of this patent

UNITED STATES PATENTS

| | | |
|---|---|---|
| 1,286,945 | Coates | Dec. 10, 1918 |
| 1,689,861 | Clark | Oct. 30, 1928 |
| 1,860,762 | Wyrick | May 31, 1932 |
| 2,254,486 | Kauffman | Sept. 2, 1941 |

FOREIGN PATENTS

| | | |
|---|---|---|
| 504,982 | Great Britain | May 3, 1939 |